3,535,168
METAL TREATING PROCESS
John S. Thompson, Detroit, Mich., assignor to Hooker
  Chemical Corporation, Niagara Falls, N.Y., a corpo-
  ration of New York
No Drawing. Filed Oct. 13, 1967, Ser. No. 675,028
              Int. Cl. C23f 7/26
U.S. Cl. 148—6.16                              10 Claims

ABSTRACT OF THE DISCLOSURE

A metal treating process wherein zinc, aluminum or ferrous metal surfaces are contacted with an aqueous acidic coating solution containing hexavalent chromium, to form a hexavalent chromium containing coating on the metal surface treated. Thereafter, an aqueous solution of hydrogen peroxide is applied to the thus-coated surface to effect a substantial reduction of the hexavalent chromium in the coating to trivalent chromium. Desirably, when zinc and aluminum surfaces are treated, the hexavalent chromium ions in the coating solution are in the form of zinc chromate or dichromate and the application of the dilute solution of hydrogen peroxide to the coated metal surface is effected by a spray application. Preferably, the coating solutions used also contain phosphate ions.

---

This invention relates to a process for coating metal surfaces and more particularly it relates to a process for treating aluminum, zinc and ferrous metal surfaces to produce thereon a paint-base coating.

Heretofore, various compositions and processes have been utilized to treat metallic surfaces so as to provide thereon a base coating suitable for the subsequent application of a paint or similar protective film. The coating compositions used have been applied by immersion, spraying, flooding and similar techniques and have included materials of the phosphate type, the chromate type, and the like.

Recently, increasing quantities of metal have been painted in the sheet and/or strip form prior to being formed into the finished painted metal article. In such instances, it is necessary that the paint base on the coated article provide the painted metal surface not only with good corrosion and humidity resistance, but it must also have good mechanical adhesion and resistance to cracking or chiping of the paint film during a forming operation. Additionally, it is important that the paint base coating used does not have an adverse affect on the luster and color of the paint film. Up to the present time, however, it has not generally been possible to achieve these results with the known paint-base coating materials, in a simple, inexpensive application process.

It is, therefore, an object of the present invention to provide an improved process for forming a paint-base coating on metal surfaces.

A further object of the present invention is to provide an improved process for producing a paint-base coating on metal surfaces, which coating provides the painted metal surface with excellent resistance to corrosion, humidity, and cracking during forming, without adversely affecting the luster and color of the paint film.

These and other objects will become apparent to those skilled in the art from the description of the invention which follows.

Pursuant to the above objects, the present invention includes a process for treating metal surfaces to provide thereon a paint-base coating, which process comprises contacting the surface to be treated with an aqueous acidic solution containing hexavalent chromium, forming a coating containing hexavalent chromium on the thus-treated metal surface, and, thereafter, contacting the coating with an aqueous solution of hydrogen peroxide, the contact with the peroxide solution being sufficient to effect substantial reduction of the hexavalent chromium in the coating to trivalent chromium. By this process, there is produced on the metal surfaces treated an excellent paint-base coating which, when painted, provides good resistance to corrosion, humidity, and forming and does not adversely affect the color or luster of the paint or similar protective film applied.

The present process may be used to coat various metal surfaces, including surfaces of zinc, aluminum, and ferrous metal. By these terms, it is intended that ferrous metal includes surfaces of iron, steel, and alloys thereof; aluminum includes surfaces of aluminum and alloys thereof; and zinc includes surfaces of zinc and alloys thereof, including hot dip galvanized surfaces and electrolytic zinc surfaces.

These metal surfaces may be treated with aqueous acidic coating solutions which contain only hexavalent chromium as the coating producing component, either as chromic acid ($CrO_3$) or as a chromate or dichromate. Various chromates or dichromates may be used, provided the ions introduced therewith are compatible with the treating solution and do not have an adverse affect on either the coating solution or the coating produced. Exemplary of suitable materials are chromates, and dichromates of zinc, calcium, cadmium, magnesium, ammonium and the like, with the zinc chromate or dichromate being preferred. Desirably, such coating solutions contain the hexavalent chromium calculated as $CrO_3$, in amounts within the range of about 0.5 to 60% by weight. Such solutions are preferably used in treating aluminum surfaces, although in some instances their use on zinc and ferrous surfaces is also satisfactory.

The aqueous acidic coating solutions used preferably contain both phosphate ions and hexavalent chromium. Desirably, these solutions contain phosphoric acid, as the source of the phosphate ions and chromic acid, as the source of the hexavalent chromium. Additionally, however, in some instances, the phosphate ions may be present as metal phosphates, such as phosphates of zinc, calcium, aluminum, cadmium, chromium, magnesium, ammonium, and the like, rather than phosphoric acid, with zinc phosphates being preferred. Similarly, as has been noted above, the hexavalent chromium may be added in the form of chromates or dichromates. It has been found, however, that for ease in obtaining the desired reduction of the hexavalent chromium in the coating upon the subsequent treatment with hydrogen peroxide, the use of more acidic treating solutions is preferred. Typically, such more acid solutions have a pH of less than about .5, although solutions which are less acid than this may also be used. The phosphate ions, calculated as $H_3PO_4$, are desirably present in the solutions in amounts within the range of about 0.5 to 60% by weight, with the hexavalent chromium, calculated as $CrO_3$, being present in similar amounts. In each instance, of course, the specific amounts of these components which are used will be such as to provide a coating solution which is substantially free of undissolved materials and which will produce the desired coating on the metal surface, depending upon the application method used. It has been found that for the treatment of ferrous metal surfaces and aluminum surfaces, excellent results are produced when using aqueous solutions of phosphoric acid and chromic acid. In the treatment of zinc surfaces, however, it has been found to be desirable to include in the treating solutions, in addition to the phosphoric acid and chromic acid, zinc ions. These latter solutions, i.e., solutions which also contain zinc ions, have also been found to be suitable for use in the treatment of aluminum surfaces. Desirably, these treating solutions contain phosphoric acid in amounts within the range of about 1 to 10% by weight, with amounts within the range of about 2 to 5% by weight being preferred in solutions for treating ferrous surfaces and amounts within the range of about 2 to 10% by weight being preferred in solutions for the treatment of zinc surfaces. Similarly, the present treating solutions desirably contain hexavalent chromium, calculated as $CrO_3$, in amounts within the range of about 1 to 10% by weight of the treating solutions, with amounts within the range of about 4 to 10% by weight of the solutions being preferred for the treatment of ferrous metal surfaces. In the coating solutions for the treatment of zinc surfaces, which solutions also desirably contain zinc, the zinc and chromic acid are present in amounts sufficient to provide zinc and hexavalent chromium in an amount equivalent to from about 10 to 25% by weight of the solution calculated as zinc dichromate ($ZnCr_2O_7$) and preferably equivalent to from about 15 to 25% by weight of the solution, calculated as zinc dichromate. As has been noted hereinabove, the treating solutions suitable for coating either ferrous surfaces or zinc surfaces are also satisfactory for the coating of aluminum surfaces.

These treating solutions may be formulated from any convenient source of phosphate ions, hexavalent chromium and zinc ions which do not introduce extraneous ions into the solution which are detrimental thereto or to the coating produced. Although, $H_3PO_4$, $CrO_3$ and $ZnO$ are the preferred sources of these components, other materials may also be used, such as, zinc acid phosphate, zinc chromate, zinc dichromate, and the like, as is known in the art.

The coating solutions as have been described hereinabove, may be applied to the metallic surfaces to be treated in any convenient manner. Thus, for example, the metal surfaces may be immersed in the coating solutions, the coating solutions may be sprayed or flowed onto the metal surface, or they may be applied by roller coating techniques. Generally, it has been found that from the standpoint of obtaining maximum utilization of the coating solutions with a minimum of waste, roller coating techniques are more efficient, and, additionally, do not generally present any waste disposal problems. Accordingly, in many instances, the use of roller coating techniques for the application of the coating solutions of the present invention are preferred. Obviously, of course, where the metal surfaces treated are in a form which is not suitable for roller coating, i.e., in a form other than sheet or strip, other coating techniques may be utilized.

The application of the coating solutions to the metal surfaces treated is desirably carried out so as to produce a coating on the surface having a coating weight within the range of about 5 to 100 milligrams per square foot, with coating weights within the range of about 20 to 50 milligrams per square foot being preferred. Where roll coating application techniques are used, line speeds of the metallic sheet or strip being coated within the range of about 50 to 500 feet per minute are typical. Desirably, the metal coating solutions are at a temperature within the range of about 20 to 65 degrees centigrade when they are applied to the metal surfaces.

Following the application of the coating solutions to the metal surfaces to be treated, the thus-applied coating is desirably dried. While it is not essential that all of the moisture be removed from the coating, the drying should be carried out at least to the extent that the coating is substantially immobilized on the metal surface. This drying of the coating may be effected in any convenient manner, as for example, by heating the metal itself in an oven or drying chamber, or by passing heated air over the metal surface. In many instances, it has been found that where the metal surface to be treated is subjected to various pretreating steps, such as cleaning, pickling or the like, sufficient heat will be imparted to and retained by the metal that the further application of external heat may not be necessary to effect the desired degree of drying of the coating.

After the drying of the coating on the metal surface has been effected, the thus-coated metal surface is then treated with an aqueous solution of hydrogen peroxide. Desirably, this solution contains from about 1.0 to 15% by weight of hydrogen peroxide and preferably contains from about 2.5 to 5% by weight of hydrogen peroxide. The hydrogen peroxide solution may be applied to the coated metal surface in any convenient manner. Inasmuch as the coating on the metal surface may not be completely dried at the time of treatment with the peroxide solution, however, the use of spray application techniques, which minimize the amount of coating washed off of the surface, are preferred. In particular, spray applications of the "mist on type" are most preferable. In such applications, the amount and particle size of the hydrogen peroxide solution applied are controlled so that the spray droplets remain on the metal surface in substantially the locus of their original contact with the surface and there is substantially no run off of excess spray solutions from the surface.

Desirably, the coated metal surface is at an elevated temperature, temperatures within the range of about 55 to 75 degrees centigrade being preferred, at the time of the application of the aqueous hydrogen peroxide solution. The desired heating of the surface may be affected, as has been noted hereinabove, at the time the coating on the metal surface is dried. In this regard, it is to be appreciated, that in many instances, sufficient heat will be retained by the metal from the pretreating operations, such as cleaning, pickling, and the like, that the application of additional, external heat to the surface to obtain the desired temperature for the application of the hydrogen peroxide solution, will not be necessary. Desirably, the hydrogen peroxide solution, itself, is at room temperature when it applied to the coated metal surface.

The amount of the aqueous hydrogen peroxide solution which is applied to the coated metal surface will be that amount which is sufficient to effect a substantial reduction of the hexavalent chromium in the coating on the metal surface to the trivalent state. Inasmuch as the quantities of the peroxide solution necessary to achieve this reduction will depend upon various factors, including the concentration of the peroxide solution used, the amount of hexavalent chromium in the coating on the metal surface, the temperature of the coating at the time of the application, and the like, the specific amount of the solution used will vary in each case. Typically, however, where the weight of coating on the metal surface is within the range of about 30 to 50 milligrams per square foot, amounts of the hydrogen peroxide solution within the range of about 1 cc. to 2.5 cc. of a 5% solution per square foot is suitable to effect the desired reduction of the hexavalent chromium to the trivalent state.

Following the treatment of the coated metal surfaces with the aqueous hydrogen peroxide solution, a suitable protective film such as a paint, lacquer, enamel, or the like, may be applied to the coated metal surface. The specific types of such protective films and their manner of application are believed to be well known to those in the art.

In carrying out the overall process of the present invention, the metal surfaces to be treated may first be subjected to various conventional, pretreating, surface cleaning and conditioning operations. These may include cleaning the surface with various alkaline or acid cleaning solutions and/or various acid pickling solutions, as are known to those in the art. Thereafter, the cleaned surface is then coated with the aqueous acidic coating solution as has been described hereinabove. Following the drying of the coating on the metal surface, the warm coated surface is then treated with the aqueous hydrogen peroxide solution, in the manner described, so as to effect substantial reduction of the hexavalent chromium in the coating to the trivalent state. In this manner, there is produced an excellent paint-base coating on the metal treated, which coating, when painted, provides excellent resistance to corrosion, humidity, and, may be formed without cracking or fracturing of the paint film. Moreover, the paint-base coating produced is not found to have any adverse affect on either the color or luster of the subsequently applied paint film.

In order that those skilled in the art may better understand the present invention and the manner in which it may be practiced, the following specific examples are given. In these examples, unless otherwise indicated, temperatures are in degrees centigrade and parts and percent are by weight. It is to be appreciated, however, that these examples are merely exemplary of the present invention and are not to be taken as a limitation thereof.

EXAMPLE 1

An aqueous coating solution was prepared containing 5% $H_3PO_4$ and 10% $CrO_3$. 4 inch by 12 inch steel panels were roll coated with this solution to produce a coating weight of 16 milligrams/square foot. The coated panels were heated to about 65° C. and an aqueous solution containing 5% $H_2O_2$ was sprayed on the coated surface. Analysis of the thus treated coated surface showed the $CrO_3$ residue in the coating was zero.

The procedure of the above example was repeated using various coating solutions and coating weights. Using this procedure the following results were obtained.

| Example | Coating solution used | Coating weight, milligrams/ sq. foot | $H_2O_2$ solution used, percent |
|---|---|---|---|
| 2 | 5% $H_3PO_4$+10% $CrO_3$ | 41 | 5 |
| 3 | 5% $H_3PO_4$+10% $CrO_3$ | 23 | 2.5 |
| 4 | 5% $Zn(H_2PO_4)_2$+5% $ZnCr_2O_7$ | 10.8 | 5 |
| 5 | 10% $Zn(H_2PO_4)_2$+10% $ZnCr_2O_7$ | 32.8 | 5 |
| 6 | 15% $Zn(H_2PO_4)_2$+15% $ZnCr_2O_7$ | 44.8 | 5 |
| 7 | 20% $Zn(H_2PO_4)_2$+20% $ZnCr_2O_7$ | 59.6 | 5 |
| 8 | 5% $CrO_3$ | 4.4 | 5 |
| 9 | 10% $CrO_3$ | 10.8 | 5 |
| 10 | 15% $CrO_3$ | 18.8 | 5 |
| 11 | 20% $CrO_3$ | 29.2 | 5 |
| 12 | 14% $ZnCr_2O_7$ | 6.1 | 5 |
| 13 | 28% $ZnCr_2O_7$ | 38.8 | 5 |
| 14 | 42% $ZnCr_2O_7$ | 36.8 | 5 |
| 15 | 56% $ZnCr_2O_7$ | 46.4 | 5 |

The procedure of the above examples was repeated with the exception that 4 inch x 12 inch hot dip galvanized panels were coated. Using this procedure, the following results were obtained:

| Example | Coating solution used | Coating weight, milligrams/ sq. foot | $H_2O_2$ solution used, percent |
|---|---|---|---|
| 16 | 10% $H_3PO_4$+25% $ZnCr_2O_7$ | 12 | 5 |
| 17 | 10% $H_3PO_4$+25% $ZnCr_2O_7$ | 18 | 5 |
| 18 | 5% $H_3PO_4$+12.5% $ZnCr_2O_7$ | 26 | 2.5 |
| 19 | 5% $Zn(H_2PO_4)_2$+5% $ZnCr_2O_7$ | 10.8 | 5 |
| 20 | 10% $Zn(H_2PO_4)_2$+10% $ZnCr_2O_7$ | 32.8 | 5 |
| 21 | 15% $Zn(H_2PO_4)_2$+15% $ZnCr_2O_7$ | 46.8 | 5 |
| 22 | 20% $Zn(H_2PO_4)_2$+20% $ZnCr_2O_7$ | 59.6 | 5 |
| 23 | 5% $CrO_3$ | 4.4 | 5 |
| 24 | 10% $CrO_3$ | 10.8 | 5 |
| 25 | 15% $CrO_3$ | 18.8 | 5 |
| 26 | 20% $CrO_3$ | 29.2 | 5 |
| 27 | 14% $ZnCr_2O_7$ | 6.1 | 5 |
| 28 | 28% $ZnCr_2O_7$ | 38.8 | 5 |
| 29 | 42% $ZnCr_2O_7$ | 36.8 | 5 |
| 30 | 56% $ZnCr_2O_7$ | 46.4 | 5 |

The procedure of the preceding examples was repeated with the exception that 4 inch x 12 inch aluminum panels were coated. Using this procedure, the following results were obtained:

| Example | Coating solution used | Coating weight, milligrams/ sq. foot | $H_2O_2$ solution used, percent |
|---|---|---|---|
| 31 | 1.7% $H_3PO_4$+4% $ZnCr_2O_7$ | 7 | 5 |
| 32 | 5% $H_3PO_4$+10% $CrO_3$ | 6.9 | 5 |
| 33 | 2.5% $H_3PO_4$+5% $CrO_3$ | 3.2 | 5 |
| 34 | 5% $Zn(H_2PO_4)_2$+5% $ZnCr_2O_7$ | 10.8 | 5 |
| 35 | 10% $Zn(H_2PO_4)_2$+10% $ZnCr_2O_7$ | 32.8 | 5 |
| 36 | 15% $Zn(H_2PO_4)_2$+15% $ZnCr_2O_7$ | 44.8 | 5 |
| 37 | 20% $Zn(H_2PO_4)_2$+20% $ZnCr_2O_7$ | 59.6 | 5 |
| 38 | 5% $CrO_3$ | 4.4 | 5 |
| 39 | 10% $CrO_3$ | 10.8 | 5 |
| 40 | 15% $CrO_3$ | 18.8 | 5 |
| 41 | 15% $CrO_3$ | 29.2 | 5 |
| 42 | 14% $ZnCr_2O_7$ | 6.1 | 5 |
| 43 | 28% $ZnCr_2O_7$ | 38.8 | 5 |
| 44 | 42% $ZnCr_2O_7$ | 36.8 | 5 |
| 45 | 56% $ZnCr_2O_7$ | 46.4 | 5 |

In all of the above examples, analysis of the coating after treatment with the $H_2O_2$ solution showed none or very little $CrO_3$ residue.

The panels treated in the above examples were painted with acrylic, vinyl, epoxy or polyester paints. Thereafter, the painted panels were subjected to the standard salt spray, humidity, knife adhesion, jig peeling and jig fracture tests. In substantially all instances satisfactory results were obtained. Additionally, there was substantially no evidence of adverse effect on either the color or luster of the paint applied.

While there have been described various embodiments of the invention, the compositions and methods described are not intended to be understood as limiting the scope of the invention, as changes therein are possible and it is intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A process for treating metal surfaces to provide thereon a paint-base coating which comprises contacting the surface to be treated with an aqueous acidic solution containing 0.5–60% hexavalent chromium, calculated as $CrO_3$, forming a coating containing hexavalent chromium on the thus-treated surface, and thereafter, contacting the coating with an aqueous solution of hydrogen peroxide, the contact with the peroxide solution being sufficient to effect substantial reduction of the hexavalent chromium in the coating to trivalent chromium.

2. The process as claimed in claim 1 wherein the coating solution also contains phosphate ions.

3. The process an claimed in claim 2 wherein the coated metal surface is at a temperature within the range of about 55 to 75 degrees centigrade at the time of the application of the aqueous hydrogen peroxide solution.

4. The process as claimed in claim 3 wherein the hydrogen peroxide solution is applied by spraying the solution on the coated surface.

5. The method as claimed in claim 4 wherein the coating solution contains from about 1 to 10% by weight of $H_3PO_4$ and from about 1 to 10% by weight of hexavalent chromium, calculated as $CrO_3$.

6. The method as claimed in claim 5 wherein the hydrogen peroxide solution contains from about 2.5 to 5.0% $H_2O_2$.

7. The method as claimed in claim 6 wherein the coating solution is applied by roller coating.

8. The method as claimed in claim 4 wherein the metal treated is zinc and the coating solution also contains zinc in an amount sufficient to provide a zinc and hexavalent chromium content in an amount within the range of about 10 to 25% by weight, calculated as $ZnCr_2O_7$.

9. The process as claimed in claim 8 wherein the hydrogen peroxide solution contains from about 2.5 to 5.0% by weight $H_2O_2$.

10. The process as claimed in claim 9 wherein the coating solution is applied by roller coating.

References Cited

UNITED STATES PATENTS

| | | | |
|---|---|---|---|
| 2,768,103 | 10/1956 | Schuster et al. | 148—6.2 |
| 2,894,865 | 7/1959 | Pryor | 148—6.16 |
| 3,053,693 | 9/1962 | Schuster et al. | 148—6.2 X |
| 3,094,441 | 6/1963 | Curtin | 148—6.16 |
| 3,271,279 | 9/1966 | Poor | 204—108 |

OTHER REFERENCES

Ardon et al.: J. Am. Chem. Soc., vol. 88, No. 4, Feb. 20, 1966, p. 858.

Ollard: The Metal Industry, Nov. 11, 1927, pp. 437, 438.

RALPH S. KENDALL, Primary Examiner

U.S. Cl. X.R.

148—6.2